US011644191B2

(12) United States Patent
Dableh

(10) Patent No.: US 11,644,191 B2
(45) Date of Patent: May 9, 2023

(54) NIR MOTION DETECTION SYSTEM AND METHOD

(71) Applicant: JDRF ELECTROMAG ENGINEERING INC., Mississauga (CA)

(72) Inventor: Roumanos Dableh, Oakville (CA)

(73) Assignee: JDRF ELECTROMAG ENGINEERING INC., Mississauga (CA)

( * ) Notice: Subject to any disclaimer, the term of this patent is extended or adjusted under 35 U.S.C. 154(b) by 0 days.

(21) Appl. No.: 17/559,259

(22) Filed: Dec. 22, 2021

(65) Prior Publication Data
US 2022/0113195 A1      Apr. 14, 2022

Related U.S. Application Data

(63) Continuation of application No. 16/568,208, filed on Sep. 11, 2019, now Pat. No. 11,243,117.

(51) Int. Cl.
| | |
|---|---|
| *H04N 5/33* | (2023.01) |
| *G01J 5/00* | (2022.01) |
| *H05B 47/105* | (2020.01) |
| *G08B 13/19* | (2006.01) |

(52) U.S. Cl.
CPC .............. *G01J 5/0022* (2013.01); *H04N 5/33* (2013.01); *H05B 47/105* (2020.01); *G08B 13/19* (2013.01)

(58) Field of Classification Search
None
See application file for complete search history.

(56) References Cited

U.S. PATENT DOCUMENTS

| | | | |
|---|---|---|---|
| 10,795,018 B1* | 10/2020 | Koteshwara | ........... H04R 1/406 |
| 11,007,935 B2 | 5/2021 | Lintz et al. | |
| 11,243,117 B2 | 2/2022 | Dableh | |
| 2004/0256541 A1 | 12/2004 | Cofer et al. | |
| 2014/0072211 A1 | 3/2014 | Kovesi et al. | |
| 2014/0104415 A1* | 4/2014 | Fox | ......................... H04N 5/332 |
| | | | 348/135 |
| 2015/0288950 A1 | 10/2015 | Zhang | |
| 2016/0162082 A1* | 6/2016 | Schwesinger | ........... G06F 3/012 |
| | | | 345/173 |
| 2018/0005033 A1 | 1/2018 | Ding et al. | |
| 2019/0197330 A1* | 6/2019 | Mahmoud | ............ G06N 3/0454 |

(Continued)

FOREIGN PATENT DOCUMENTS

EP          1544823 A2      6/2005

*Primary Examiner* — David P Porta
*Assistant Examiner* — Mamadou Faye
(74) *Attorney, Agent, or Firm* — DLA Piper LLP US

(57) ABSTRACT

A motion sensor for detection motion of humans is provided. The motion sensor contains a near infrared (NIR) low resolution image sensor that captures image frames in the near infrared spectrum and a sensor that detects the amount of visible light. In addition, a processor is connected to the visible light sensor and the NIR motion sensor. The processor is configured to receive the amount of visible light from the visible light sensor and the images from the NIR low resolution image sensor. The processor is further configured to compare the image frames to detect motion; the sensitivity of the detection of motion is determined by the amount of visible light detected by the visible light sensor. The output has two or modes based on the detection of motion by the processor.

13 Claims, 3 Drawing Sheets

(56) References Cited

U.S. PATENT DOCUMENTS

| | | |
|---|---|---|
| 2019/0213429 A1* | 7/2019 | Sicconi ................ G06F 3/0346 |
| 2019/0259270 A1 | 8/2019 | Amini et al. |
| 2019/0278976 A1 | 9/2019 | Khadloya et al. |
| 2019/0349715 A1 | 11/2019 | Ghourchian et al. |
| 2021/0074138 A1 | 3/2021 | Mieko et al. |

* cited by examiner

NIR MOTION DETECTION SYSTEM AND METHOD

RELATED APPLICATIONS

This application is a continuation and claims priority under 35 USC 120 of U.S. application Ser. No. 16/568,208, filed Sep. 11, 2019 and titled "NIR MOTION DETECTION SYSTEM AND METHOD" the entirety of which are incorporated herein by reference.

FIELD

This disclosure relates to using low cost sensors to detect human occupancy of rooms. In particular, it relates to the use of near-infrared detection to detect motion.

BACKGROUND

Devices may require that they determine if a human is in the vicinity, such as occupying a room. Devices may include lights, or light controls which may turn off or operate at lower power when no one is in the room in order to save power.

Some motion sensors contain passive infrared (PIR) sensors that detect the infrared radiation emitted by occupants. This radiation typically has a wavelength of about 15 micrometers ($\mu$m) to 1 mm (corresponding to a frequency range of about 20 THz to 300 GHz) and is generally referred to as Far Infrared Radiation (FIR).

PIR-based motion sensors may operate by detecting changes in the FIR spectrum caused by the movement of an occupant(s). This type of sensor may be used in many application areas, including lighting control and building automation.

If a device turns off because it does not detect occupancy, but a person is still present, this can be annoying to the person. Alternatively, if a sensor detects occupancy, such as by a heated object or air movements, lights may stay on or turn on unnecessarily.

SUMMARY

A motion sensor for detection motion of humans is provided. The motion sensor contains a multi-pixel image sensor that captures frames in the near infrared spectrum. It may also capture some level of visible light. In an embodiment, the multi-pixel sensor is accompanied by a visible light sensing element. In another embodiment the multi-pixel sensor may determine the total light, near infrared and visible, entering the field of view of the sensor. In addition, a processor is connected to the multi-pixel image sensor. The processor is configured to receive the amount of visible light from the visible light sensor and the images from the NIR image sensor. The processor is further configured to compare the image frames to detect motion; the sensitivity of the detection of motion is determined by the amount of visible light detected by the visible light sensor. The output has two or modes based on the detection of motion by the processor.

In an aspect, a method of detecting motion of humans involves receiving an amount of visible light detected using a visible light sensor and receiving a plurality of frames from a near infrared low resolution image sensor that captures the frames in the near infrared spectrum. The method includes comparing two or more frames of the plurality of frames to detect motion using a processor, wherein the sensitivity of the detection of motion is determined by the amount of visible light detected by the visible light sensor. The changing the mode of an output is based on the detection of motion.

BRIEF DESCRIPTION OF THE DRAWINGS

In drawings which illustrate by way of example only a preferred embodiment of the disclosure.

DETAILED DESCRIPTION

Figure 1:
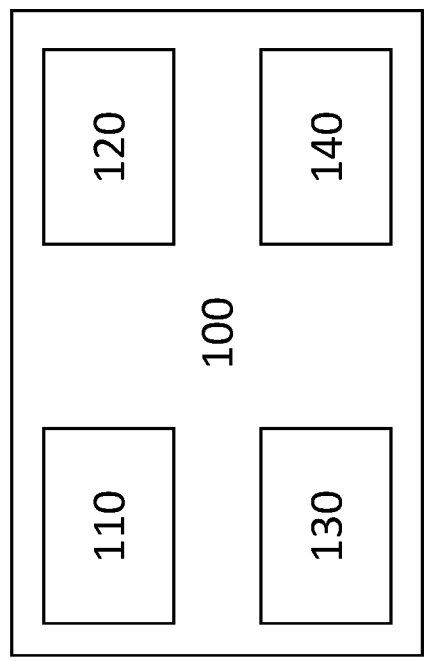
FIG. 1 is a schematic diagram of a motion sensor.
Figure 2:
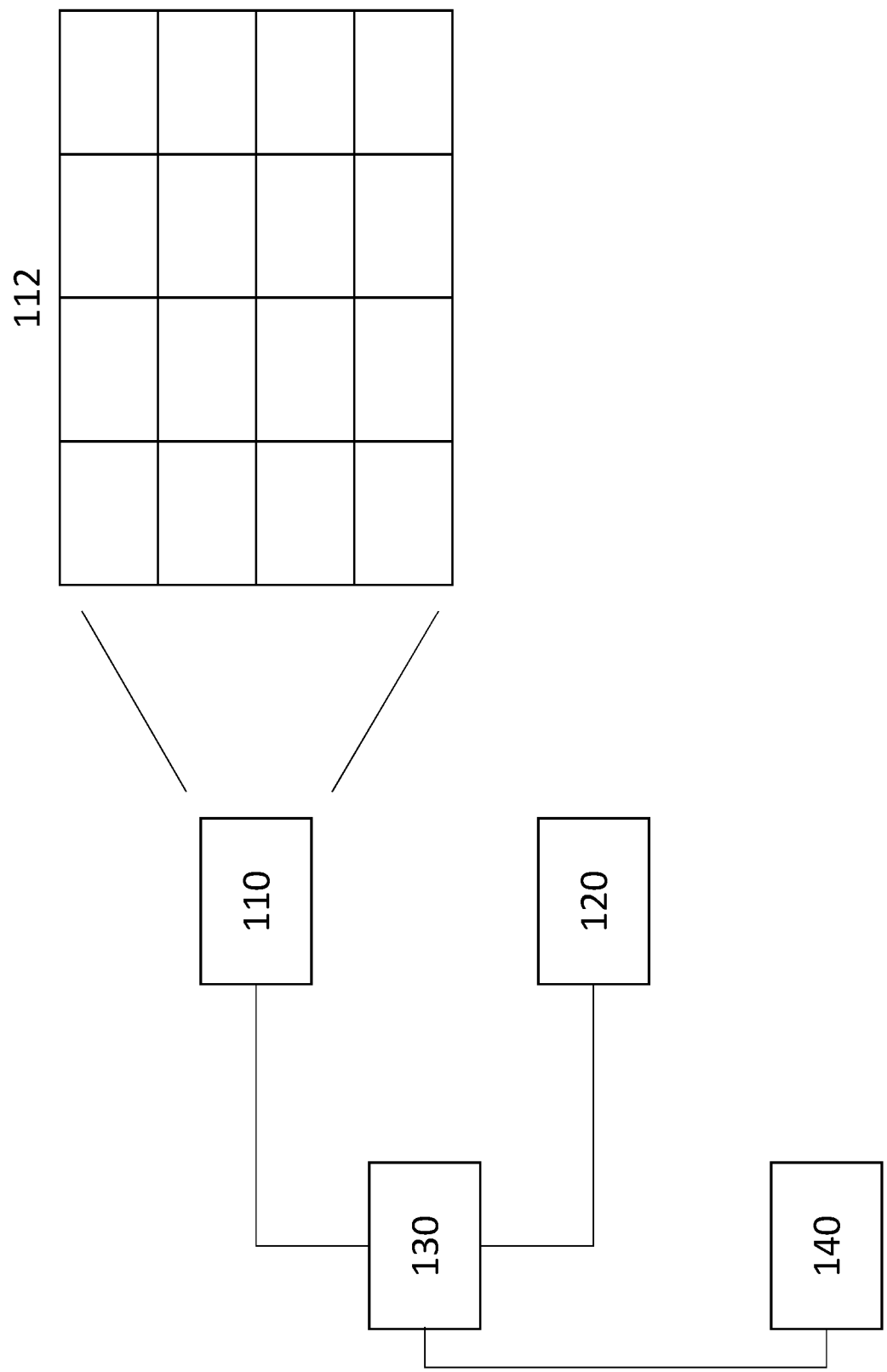
FIG. 2 is a schematic diagram showing connections within the motion sensor.

This disclosure relates to a motion sensor 100 that detects changes on the Near Infrared Spectrum (NIR). The NIR spectrum is typically considered light that has a wavelength between about 0.7 and 1 $\mu$m, which corresponds to a frequency of 428 THz to 200 THz. It represents the segment of the Electromagnetic Spectrum adjacent to the visible light spectrum. NIR has a longer wavelength than visible light.

Human occupants do not emit a meaningful amount of NIR themselves but they do reflect NIR that may be incident on the human occupants, such as from natural (e.g. sunlight) or artificial light sources that contain NIR.

NIR may be detected with detectors such as low resolution image sensors or imagers, including many digital low resolution image sensors designed for visible light. Filters for visible light may be applied so that a low resolution image sensor only can receive NIR. In contrast, passive IR (PIR) sensors as referred to above, may require specialized detectors.

If only NIR or visible spectrum is used to detect motion, false positives may be a problem. Changes in background illumination levels can be incorrectly classified as motion by a NIR or visible light sensor. For example, a dramatic change in ambient light level, such as bright sunshine entering a window, can be incorrectly identified as movement. By reducing the number of false positives, there may be reduced annoyance and inconvenience to users by having lights off when they are desired to be on. There may also be substantial energy efficiencies by reducing the amount of overall time that lights are activated.

Processes may try to overcome false trips caused by changes in background illumination levels. These processes may communicate with sensors that capture visible light. Such processes may be used in video surveillance and machine vision applications.

These processes may involve sophisticated statistical models that judge the likelihood of change in a succession of images being caused by motion or by changes in background illumination. Some techniques involve advance knowledge of a reference set of features or of the background and its characteristics, such as a scene, to "train" the process. The techniques used in these processes may be applicable to an image sensor that captures NIR. However, the processes that are directed to effectively overcoming false positives usually require powerful microprocessors that may be cost prohibitive for a device used in a lighting control or building automation application.

In a present embodiment, successive frames from a low resolution image sensor or imager may be compared or subtracted from one another, leaving only the moving object. Features may be extracted from the difference in frames of training sets to train a machine learning classifier.

One measure of detection accuracy is the F-Score. The F-Score is the harmonic average of the precision and recall of a detection system. For the purposes of defining an F-Score, precision may be defined as true positives/(true positives+false positives). Similarly, recall may be defined as true positives/(true positives+false negatives).

Using precision and recall defined in this manner, F-Score may be determined by $$F\ score=2*precision*recall/(precision+recall);$$

The motion sensor 100 may include an NIR sensor 110. The NIR sensor may include multiple elements or pixels arranged in a grid 112 to form a multi-pixel sensor. The number of pixels for a field of view may be selected such that the image capture does not capture enough detail to cause privacy concerns. These privacy concerns may include identifying specific information, capturing text on documents, reading computer screens or capturing identifying characteristics of a person. The NIR sensor may include or work in conjunction with a source of IR illumination such as one or more IR LEDs. The source of IR illumination, such as the one or more IR LEDS, may be integrated with or separate from the motion sensor 100. The motion sensor 100 may also include a visible light sensor 120 or daylight sensor. The visible light sensor 120 may be a single element/pixel sensor separate from the NIR sensor 110, or the multi-pixel sensor may determine the total light, near infrared and visible, entering the field of view of the sensor. The daylight sensor may also be the collective sum of readings from more than one element/pixel. The motion sensor 100 may also include a processor 130, such as a micro-controller, containing or including a low cost microprocessor. The motion sensor may be connected to, be integrated with an output 140, such as a light or light system. The output may have two or more modes such as on/off, low/medium/high output levels, or an output gradient. The motion sensor may in addition or alternatively, connected to a control system and communicate the status of the motion sensor to the control system.

The motion sensor 100 may also include or receive signals from a real-time clock such that the processor can determine and base its actions on the time. The real-time clock may be integrated with the motion sensor 100. The real-time clock may be accessible over a network connected to the motion sensor 100.

The motion sensor 100 may use the readings from the image sensor and the visible light sensor to determine if there is motion. The micro-processor may use the readings to generate an output or change its output, such as activating a light, if motion is detected. The visible light sensor may detect visible light levels in the vicinity of the sensor, such as from ambient sunlight entering from windows, or artificial lights. The visible light sensor 120 may detect the absolute value of the brightness of the visible light. The visible light sensor 120 may detect changes in the brightness of visible light.

The sensor may factor environmental conditions into the decision to change the state of the sensor. For example, the sensor may choose to suspend a classification decision during changes in ambient light above a certain threshold. A different threshold value can be applied to changes in ambient light for a given direction (increasing or decreasing ambient light).

The absolute value and the change of value in daylight readings over a specified time frame may be used in several ways. For example, motion detection may only be enabled once the ambient daylight readings have stabilized, such as when the change in value of visible light is below a determined value for a period of time. As another example is for the processor to compare daylight sensor changes with changes in the NIR sensor. In this way, even a simple daylight sensor may be used in combination with the NIR sensor.

The detection of a rapid change in daylight readings may dampen the sensitivity of the sensor's response to changes detected by the NIR system over the same time frame. In this way, a dramatic change in daylight may reduce the sensitivity of the NIR sensor.

A rapid change in daylight readings may suspend the processing of the NIR readings over the same time period as the rapid change in the daylight readings.

The overall visible light level may be used to load different tuning parameters that make the sensor more or less sensitive to motion detected in NIR. For example, a sensitivity threshold may be adjusted based on the daylight reading or change in daylight readings. A threshold may be multiplied by a number less than 1 based on the current daylight sensor reading. For example, a low confidence detection of motion or a small amount of motion may be less important when the daylight sensor detects bright ambient light than a similar detection of motion when there is less ambient light. The sensitivity for motion may be reduced when the system is more likely to have false positives.

The change in visible daylight readings or the absolute level of visible daylight readings may cause the sensor to process a higher number of frames before making a decision on changes in NIR. For example, if images are captured at a specific frame rate, such as 12 to 15 frames per second, instead of processing the changes over 2 frames, a change over 4 frames may be determined. In this way, one or two frames of extraneous data may be ignored.

While often high responsiveness to detected changes is desirable, if there are changes that are likely to be false positives, a slower response rate may be beneficial. Increasing the number of frames in circumstances determined by the daylight sensor may reduce false positives although responsiveness may be reduced. The number of frames to compare before determining if motion has occurred may be dynamically determined based on the daylight sensor and/or the noise levels of the detected frames. In this way, the system may be self-optimized to reduce false positives.

The number of frames to compare may also depend on the location and history of detection of motion. For example, in a low traffic location, a motion sensor may wait and compare additional frames before determining motion has occurred while in a high traffic location, the low latency may be preferred and there is a lower risk of false positives. Considering additional frames may increase accuracy but is a trade off with latency.

Determining motion may be more than just a comparison of subsequent frames or performing noise reduction processes of individual frames.

Figure 3:
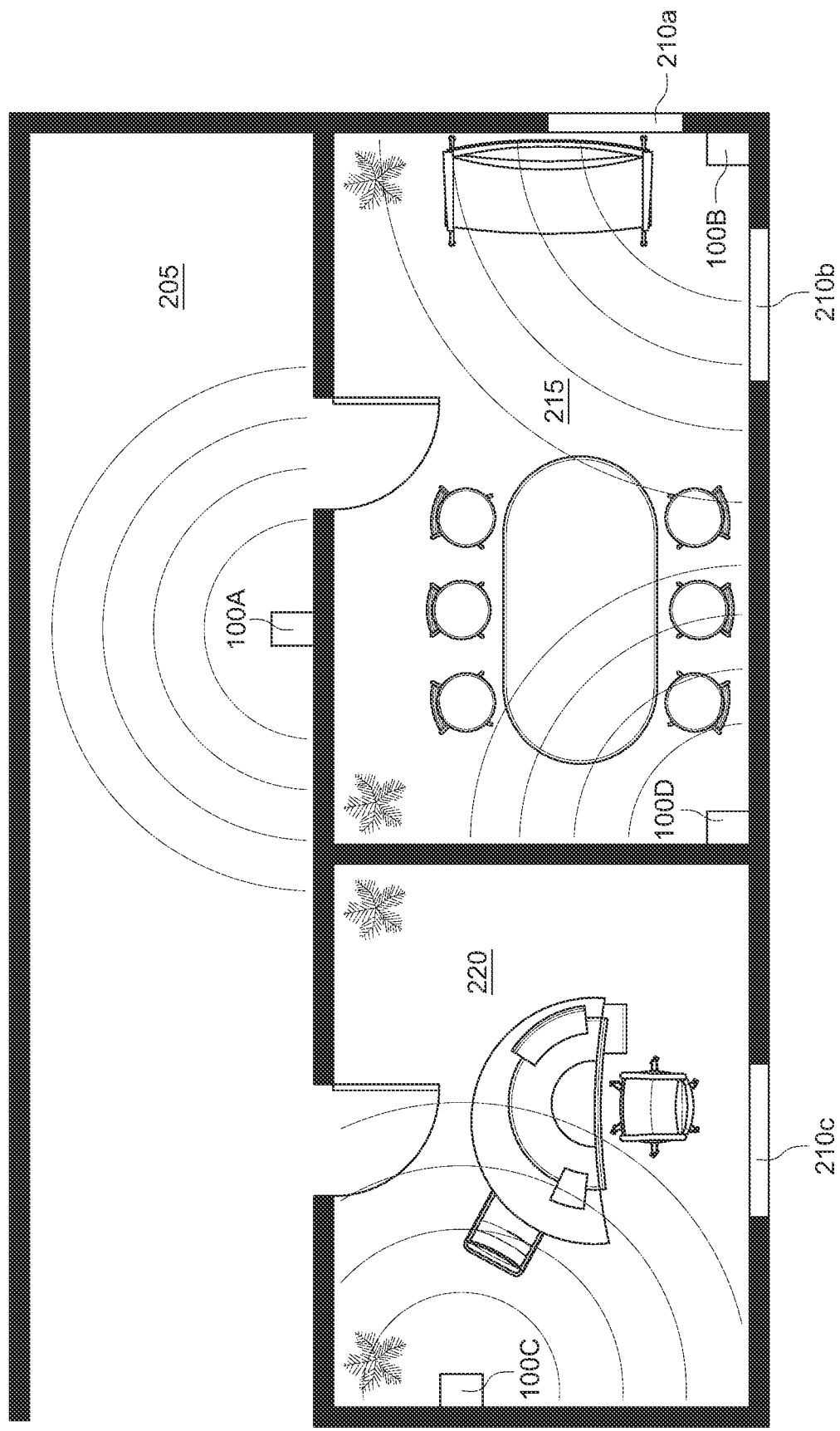
FIG. 3 is a schematic diagram of motion sensors in several rooms and a hallway.

With reference to FIG. 3, motion sensors 100A, 1008, 100C and 100D may be placed in rooms 215, 220 of a building, including in a hallway 205. Each motion sensor may have a region or space within which it can detect motion. The detection of motion may be affected, as described elsewhere in this document by ambient light, such as entering through windows 210a, 210b, and 210c.

The sensitivity of the NIR motion sensor may also change depending on the time of day. For example, a first sensitivity may be used during office hours, a second sensitivity for after hours while a third sensitivity may be used overnight.

The use of the daylight sensor in conjunction with the NIR sensor does not preclude the use of additional techniques to improve the detection of movement. For example, analysis may be done on the number and/or arrangement of NIR pixels that detect a change in level to assess the likelihood that the change in level was caused by motion. Other techniques can include background modelling or training the algorithm with reference images gathered onsite or preloaded offline.

A machine learning process can be used to classify images obtained from the NIR sensor into categories or classifications. Rather than the actual images being used for training, subtracted images may be prepared by subtracting an image from the NIR low resolution image sensor from a subsequent image to identify differences between the images. The machine learning process may be a module, library on a processor or separate hardware that performs image motion classification.

These categories or classifications may include an indication of vacancy, major motion or minor motion. Additional categories or classifications may be included. The machine learning process may be trained using images, sets of images or video offline to classify the inputs into one or more of the categories. Features such as intensity of motion, distribution of the motion, and fade of the motion in various directions may be incorporated into the training. The features derived from the training data may include spatial or frequency of the inputs, or time domain analysis of the training data. The features also include input from a daylight/ambient light sensor and the time of day. The features may also include other sensors of a motion sensor. One or more trained classifiers may then be exported to or incorporated into a motion sensor.

Misclassifications may have different levels of severity. This is particularly the instance for a motion sensor controlling a light as an output. In some instances, such as if a room is occupied, it may be very undesirable, i.e. very severe, for the light to be put in an off mode—e.g. turn off. This would be considered a false negative. On the other hand, a light remaining in an 'on' mode for a period of time after a person has left a room may be have a low severity—a false positive. The degree of severity in different scenarios may depend on the location and position of the motion sensor. A motion sensor 100A operating a light in a hall 205 may have different requirements than a motion sensor operating a light in a board room. Since the location and environmental operating conditions of a given sensor may not be known prior to installation, the motion sensor is equipped with a mechanism adapt the classification algorithm based on site condition. It can dynamically adjust the classification model based on time of day, location and current light level. The motion sensor may be biased to place more penalty on classification errors that are considered more severe.

The process of classifying inputs from the NIR sensor and daylight sensor may change depending on the degree of ambient light for a motion sensor connected to a light as well as the current light level output or location of the light. For example, a false positive while room lights on may result in lights staying on longer than needed after the occupant has left the room, delaying the vacancy state. A false positive while room lights are off may result in lights changing state from off to on when there is no occupant. A false negative while room lights are on may result in lights change state from on to off while there is an occupant in the room. A false negative while room lights are off may result in increased detection latency while a person is in the field of view of the sensor, delaying the turning on of the lights.

Once trained, a confidence for each classification/category may be determined. During operation, the classifier may be fed features, such as images, or such as subtracted images, from the NIR low resolution image sensor, visible light levels and changes, and the time of day. The classifier may generate a confidence of various classifications, including motion. The classification may be performed by the processor using an input image detected by the NIR sensor and from the daylight sensor. Based on the confidence in each category, adjustments may be made to an output from the motion sensor. The adjustment to an output from the motion sensor may be changing a light level of a light connected to the motion sensor or changing a timer duration. A timer duration affects how long an output remains in a state after motion is detected, for example, how long a light remains on after motion is detected. An output may be activated for longer if the confidence of motion being detected is higher. For example, if probability an input being actual motion rather than a false positive, is low, a light may be turned on for a shorter period of time. Motion often has a pattern such as starting on an edge of a field of view, continuing for a period of time and often leaving the field of view at some later point. Motion that does not follow this pattern may be considered of lower probability of actual motion and more likely to be a false positive. A series of potential motion events that do not fit a typical pattern may be rejected or sensitivity parameters adjusted to avoid false positives that result in lights or other outputs being activated.

The classification process may adjust sensitivity parameters based on changes in daylight detected using the ambient light sensor. The classification process may adjust penalties based on the spatial location of a given sensor. This allows the sensor to perform a trade-off at run time, during operations, to find a better optimum between classification errors. For example, a motion sensor 100B in a room 215 in the corner of two windows 210a, 210 b may be biased towards fewer false positives, whereas a motion sensor 100A in a hallway may be biased towards fewer false negatives. In this way, the motion sensor in the hallway may be less likely to turn off even if no motion is detected in the hallway. The motion sensor may be pre-configured prior to installation, updated or configured at the time of installation or configured after installation with its location, or an operating mode depending on its desired operation. The motion sensor may be updated or configured by modifying configuration switches or variables or replacing or updating software running on the motion sensor.

The sensor may self-configure, or self discover aspects of its surroundings after installation. For example, the sensor may identify or classify the presence of windows, the type of room it is operating or other pertinent physical conditions as a means to improve accuracy. The sensor may examine the captured frames and determine the presence and the location of one or more windows. Windows may represent a source of background illumination. Identifying and classifying windows in the field of view may be done by comparing intensity values over a time frame. Changes in intensity may vary significantly more for a window than for a wall, desk or other features in the field of view. A threshold may be fixed for the variance in intensity above which is classified as a window. This threshold may be pre-determined or modified if it is determined to be too sensitive (e.g. a majority of the frame is misidentified as a window). One or more regions of interest within the frame may be identified based on the location of the window. A lower, or different, sensitivity value may be applied to the window portions of the frame than to other regions of the frame. In this way, changes originating within the window region of the frame may be given less importance than change within other portions of the frame. Such a process may similarly detect an independently controlled light, such as a desk light, that is in or near the field of view.

The sensor may classify its location based on observed patterns of motion. For example, if the detected motion typically originates at one side of the field of view, and typically passes through the field of view and leaves another side of the field of view, or vice versa, the sensor may classify itself as being positioned in a hallway and apply different processes (such as lower latency and may be biased towards fewer false negatives as described above). If the detected motion tends to stay within the field of view for extended periods, the sensor may classify itself as being positioned in an office or boardroom.

For a motion sensor that utilizes a trained classifier, the motion sensor may have multiple classifiers available and select or switch between classifiers. The motion sensor may change classifiers if anomalies are detected, such as false positives. The motion sensor may change classifiers based on daylight sensor values, location or time. For example, a motion sensor may have a first classifier that is used during work hours and a second classifier that is used the rest of the time. In this way, the motion sensor can take advantage of a trained classifier in multiple circumstances without the particular device requiring re-training or additional training data.

By doing so, each motion sensor may factor in ambient light levels as detected by the ambient light sensor, time of day, location in the building and traffic patterns to determine settings that reduce the observed frequency of false positives and false negatives.

The motion sensor may divide the image from the NIR low resolution image sensor into multiple regions and place more or less sensitivity on certain parts of the frame. For example, the pixels around the perimeter of the frame may be weighted differently than those in the center of the frame. One or more regions may receive less weight if anomalies are detected to a greater extent in the one or more regions. For example, the NIR low resolution image sensor of a motion sensor 100C in a room 220 may capture in the corner of the frame movement in an adjoining hallway 205. The region of the frame associated with the hallway may be given less weight when considering if the room has motion since motion in the hallway is not indicative of motion in the room.

The motion sensor may examine its own history of classification decisions to perform a self-assessment of accuracy. The history of classifications may be stored in digital memory associated with the motion sensor and connected with the processor.

The duration of this history may span a time interval that is greater than the decision-making latency. For example, the detection of motion, when lights are off, may be done within a latency of 50 ms to be suitable for a particular application. For a NIR low resolution image sensor that captures images at 60 frames per second, the process has 3 frames to decide whether to classify a motion and activate the lights. The history of classification decisions may be longer than the three frames and preferably is at least ten times the latency, such as including 100 frames or more.

The motion sensor may examine anomalies in the sequence of historic decisions to determine if there is a need to adjust classification parameters. For example, if the motion sensor detects motion after examining frames 1 to 3 but then does not detect motion for the next 100 frames, the algorithm may deem this scenario as an anomaly. This is done by comparing the historic decision sequence to typical motion sequences. For example, a detection of motion is typically followed by some level of additional minor or major motion.

In this way, the motion sensor may improve its accuracy over time by detecting these anomalies in the historic pattern of classifications. Anomalies in the classification history may be classified as false positives or false negatives. Revisions to the global detection parameters can be made in accordance with the anatomies detected to reduce the future probability of false positives and false negatives. For example, the sensitivity of certain pixels or regions in the frame may be adjusted to increase or decrease the response of the detection algorithm. As discussed above, this may arise from a window, a separately controlled light, or something like a mirror or shiny object that does not represent light levels or motion that relate to the room or field of view as a whole.

The determination of an anomaly may result in the algorithm learning or modifying itself after installation, during run time and making changes to classification parameters, detection sensitivity or other parameters. The sensor can also examine the time difference between shutting the lights off and new detection of motion as part of a mechanism to reduce false negatives. If the lights are turned off and motion is detected a very short time later, then this may indicate that the lights should not have been turned off. As discussed above, this may result in adjustments to the sensitivity and to the timer duration.

The identification of an anomaly may result in the motion sensor making changes to the classification parameters, detection sensitivity or other parameters.

Various embodiments of the present disclosure having been thus described in detail by way of example, it will be apparent to those skilled in the art that variations and modifications may be made without departing from the disclosure. The disclosure includes all such variations and modifications as fall within the scope of the appended claims.

The invention claimed is:

1. A motion sensor comprising:
a NIR sensor to capture a first image and a second image in a near infrared spectrum, wherein the second image is captured after the first image by a period of time;
a processor to generate a subtracted image from the first image and the second image, wherein the subtracted image is to highlight a change over the period of time; and
a classifier to classify the change via a machine learning process, wherein the classifier is trained to classify the change, via supervised training, as representing one of a state of vacancy, a major motion, and a minor motion, and wherein the classifier determines a confidence value associated with a classification; wherein the confidence value is used to control a space lighting system.

2. The motion sensor of claim 1, further comprising a visible light sensor to measure an intensity of total visible light, wherein the intensity of total visible light is to be used by the classifier.

3. The motion sensor of claim 1, further comprising a source of light in the near infrared spectrum to provide light to be reflected to the NIR sensor.

4. A method comprising:
capturing a first image in a near infrared spectrum with a NIR sensor;
capturing a second image in the near infrared spectrum with the NIR sensor, wherein the second image is captured after the first image by a period of time;
generating a subtracted image from the first image and the second image, wherein the subtracted image is to highlight a change over the period of time;
training a classifier to classify the change via supervised training, wherein training the classifier comprises training the classifier to classify the change as representing one of a state of vacancy, a major motion, and a minor motion;
classifying the change with a machine learning process;
determining a confidence value associated with a classification; and
controlling a space lighting system based on the confidence value.

5. The method of claim 4, further comprising measuring an intensity of total visible light, wherein the intensity of total visible light is to be used to classify the change.

6. The method of claim 5, wherein determining the confidence value is based on the intensity of total visible light.

7. The method of claim 4, further comprising providing light from a source of light in the near infrared spectrum, wherein the light is to be reflected off a surface to the NIR sensor.

8. An apparatus comprising:
an space lighting system;
a NIR sensor to capture data, wherein the data includes a plurality of images in a near infrared spectrum;
a processor to generate a subtracted image from a first image and a second image, wherein the first image and the second image are successive images from the plurality of images, and wherein the subtracted image is to highlight a change between the first image and the second image; and
a classifier to classify a change between first image and the second image, wherein a classification of the change is used to control the space lighting system.

9. The apparatus of claim 8, wherein the classifier is trained via a supervised training method.

10. The apparatus of claim 9, wherein the classifier is to classify the change as representing one of a state of vacancy, a major motion, and a minor motion, wherein the space lighting system is deactivated during the state of vacancy.

11. The apparatus of claim 10, wherein the classifier determines a confidence value associated with the classification.

12. The apparatus of claim 11, further comprising a visible light sensor to measure an intensity of total visible light, wherein the intensity of total visible light is to be used by the classifier to determine the confidence value.

13. The apparatus of claim 12, wherein the confidence value is used to control the space lighting system.

* * * * *